(12) United States Patent
Shin

(10) Patent No.: US 7,734,389 B2
(45) Date of Patent: Jun. 8, 2010

(54) FAULT INFORMATION MANAGEMENT SYSTEM AND A METHOD FOR IMPLEMENTING A FAULT INFORMATION MANAGEMENT SYSTEM FOR A VEHICLE

(75) Inventor: Jeong Heon Shin, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 720 days.

(21) Appl. No.: 11/648,749

(22) Filed: Dec. 29, 2006

(65) Prior Publication Data
US 2008/0103650 A1    May 1, 2008

(30) Foreign Application Priority Data
Oct. 31, 2006   (KR)   .................. 10-2006-0106095

(51) Int. Cl.
*G01M 17/00* (2006.01)
(52) U.S. Cl. ....................................... 701/29
(58) Field of Classification Search .............. 701/29; 702/182–185; 714/100, 25
See application file for complete search history.

(56) References Cited

U.S. PATENT DOCUMENTS 6,128,555 A * 10/2000 Hanson et al. ................ 701/13
6,654,910 B1 * 11/2003 Eibach et al. ................ 714/37

FOREIGN PATENT DOCUMENTS

| JP | 58-083228 | 5/1983 |
|---|---|---|
| JP | 02-023232 | 1/1990 |
| JP | 2005-053309 | 3/2005 |
| KR | 10-1997-0015232 | 4/1997 |
| KR | 10-1997-0065202 | 10/1997 |
| KR | 10-1997-0065204 | 10/1997 |
| KR | 1998-039772 | 9/1998 |
| KR | 10-2004-0011230 | 2/2004 |

* cited by examiner

*Primary Examiner*—Yonel Beaulieu
(74) *Attorney, Agent, or Firm*—Morgan, Lewis & Bockius LLP

(57) ABSTRACT

The present invention relates to a fault information management system and method for implementing fault information management system for a vehicle. The present invention provides a fault information management system for a vehicle comprising: an interface for connecting a fault item; a first memory for storing a fault state; a memory for establishing a management reference for each fault item; a logic which manages fault information and fault history; and a second memory for storing a fault state.

8 Claims, 4 Drawing Sheets

FAULT INFORMATION MANAGEMENT SYSTEM AND A METHOD FOR IMPLEMENTING A FAULT INFORMATION MANAGEMENT SYSTEM FOR A VEHICLE

CROSS-REFERENCE TO RELATED APPLICATION

This application claims priority to Korean Patent Application No. 10-2006-0106095, filed on Oct. 31, 2006, in the Korean Intellectual Property Office, the disclosure of which is incorporated herein by reference.

BACKGROUND OF THE INVENTION a) Field of the Invention

The present invention relates to a fault information management system and method for implementing a fault information management system in a vehicle. In particular, when a vehicle controller fails, the fault information management system enables information and history thereof to be managed by a fault management logic and to be stored in a designated memory. The fault information management system is readily applied to fault management methods of various controllers by constituting a program module for managing fault information of a vehicle and adjusting a fault state transition by establishing a fault management reference for each fault item.

b) Description of the Prior Art

In general, a process for managing a fault of controllers and various sensors of a vehicle is defined as OBD (On-Board Diagnostics), and the enactment of the process thereof are different in each country.

According to the enactments, matters relating to a management of fault information for various controllers of a vehicle and a fault lamp are described therein. Basic information for a vehicle (rpm, engine temperature, etc.) that is stored when the vehicle is not operating is also specified therein. Therefore, the enactments are considered as being essential when developing a vehicle controller.

Since various controllers of a vehicle have a self diagnostic function, the controllers receive signals from various sensors attached to devices to be diagnosed and detect a function state of each device. The controller then stores a diagnostic code corresponding to the detected function state in the inside memory. However, it is a disadvantage that diagnostic codes stored in respective controllers can be sent outside (i.e. output) in various ways. Therefore, a fault information history of a vehicle sometimes cannot be managed properly.

The present invention provides a fault information management system which solves the problem described above.

SUMMARY OF THE INVENTION

An object of the present invention is to provide a fault information management system and method of implementing the fault information management system. When a vehicle controller fails, the fault information management system enables information and history thereof to be managed by a fault management logic and to be stored in a designated memory. This can be readily applied to fault management methods of various controllers by constituting a program for managing fault information of a vehicle and adjusting a fault state transition by establishing a fault management reference for each fault item.

In one aspect of the present invention, a fault information management system for a vehicle comprises: an interface for connecting a fault item, and is connected to each controller of a vehicle; a first memory for storing a fault state, and stores fault information occurring in the present time for each fault item; a memory for establishing a management reference for each fault item, and establishes the management reference for each fault item and transmits it to a logic means for managing a fault; a logic which manages fault information and fault history and manages the fault information and fault history according to the management reference for each fault item; and a second memory for storing a fault state, and stores the fault information managed by the logic which manages the fault information and fault history together with further priority order information.

In a preferred embodiment, the fault information management system of the present invention further comprises an external diagnosis tool that displays the information stored in the second memory for storing the fault state.

In another aspect of the present invention, a method for implementing the fault information management method for a vehicle comprises the steps of: detecting a fault for each fault item and recognizing a fault configuration through an interface for connecting a fault item that is connected to each controller of a vehicle; storing fault information occurring in the present time for each fault item in a first memory for storing a fault state through the interface for connecting the fault item; establishing a management reference for each fault item and transmitting it to a logic which manages a fault in a memory for establishing a management reference for each fault item; managing a fault state and information according to the management reference for each fault item depending on the information provided from the first memory; and storing the fault information managed by the logic which manages the fault information and fault history together with further priority order information in a second memory for storing a fault state.

In a preferred embodiment, the method of implementing the fault information management further comprises an interface for connecting the fault items and allowing a preset fault-information-related parameter to be placed in a diagnosis function of a specific controller in order to minimize the setting of the fault-information-related parameter.

In another preferred embodiment, the method of implementing the fault information management further comprises information about whether there is a fault in the present time, information about whether there was a fault in the past time.

In another preferred embodiment, the method of implementing the fault information management further comprises a second memory which stores information transmitted from the logic which manages the fault information and fault history so that fault basic information, a fault state; and a counter for determining a fault and controller configuration information are stored in the second memory and transmits the stored information to an external diagnosis tool so as to be displayed thereon.

In another embodiment, the method of implementing the fault information management further comprises when the management reference for each fault item is to be established by a controller developer, the memory for establishing the management reference for each fault item stores the established management reference in the logic which manages the fault to reflect thereto. Additionally, an initial value of a counter for determining a fault, a fault lamp operating mode and a critical value for displaying a fault are stored as the management reference.

In another preferred embodiment, the method of implementing the fault information management comprises a logic which manages the fault information and fault history. The logic compares fault information for the past fault history with the present fault history, manages them, and transmits the comparison result to the second memory for storing the fault state.

DETAILED DESCRIPTION OF THE INVENTION

Hereinafter, preferred embodiments of the present invention will be described in detail with reference to the accompanying drawings.

A fault information management system for a vehicle of the present invention comprises: an interface for connecting a fault item; a first memory for storing a fault state; a memory for establishing a management reference for each fault item; a logic which manages fault information and fault history; a second memory for storing a fault state; and an external diagnosis tool that displays the information stored in the second memory for storing the fault state.

Since the interface for connecting the fault item is connected to each controller of a vehicle and fault items for respective controllers are different from each other, it is necessary to set fault-information-related parameters for storing such information respectively.

Hence, the interface for connecting the fault item of the present invention allows preset fault-information-related parameters to be placed in a diagnosis function of a specific controller in order to minimize the setting of the fault-information-related parameters and to be connected with a fault information management module irrespective of the contents of the fault item.

The first memory for storing the fault state stores fault information occurring in the present time for each fault item, serves for storing primarily information transmitted from the interface for connecting the fault item, and serves for transmitting such information to the logic which manages the fault information and fault history so as to refer thereto.

Here, information about whether there is a fault in the present time, information about whether there was a fault in the past time, and a fault configuration are stored in real time in the first memory for each fault item.

Figure 1:
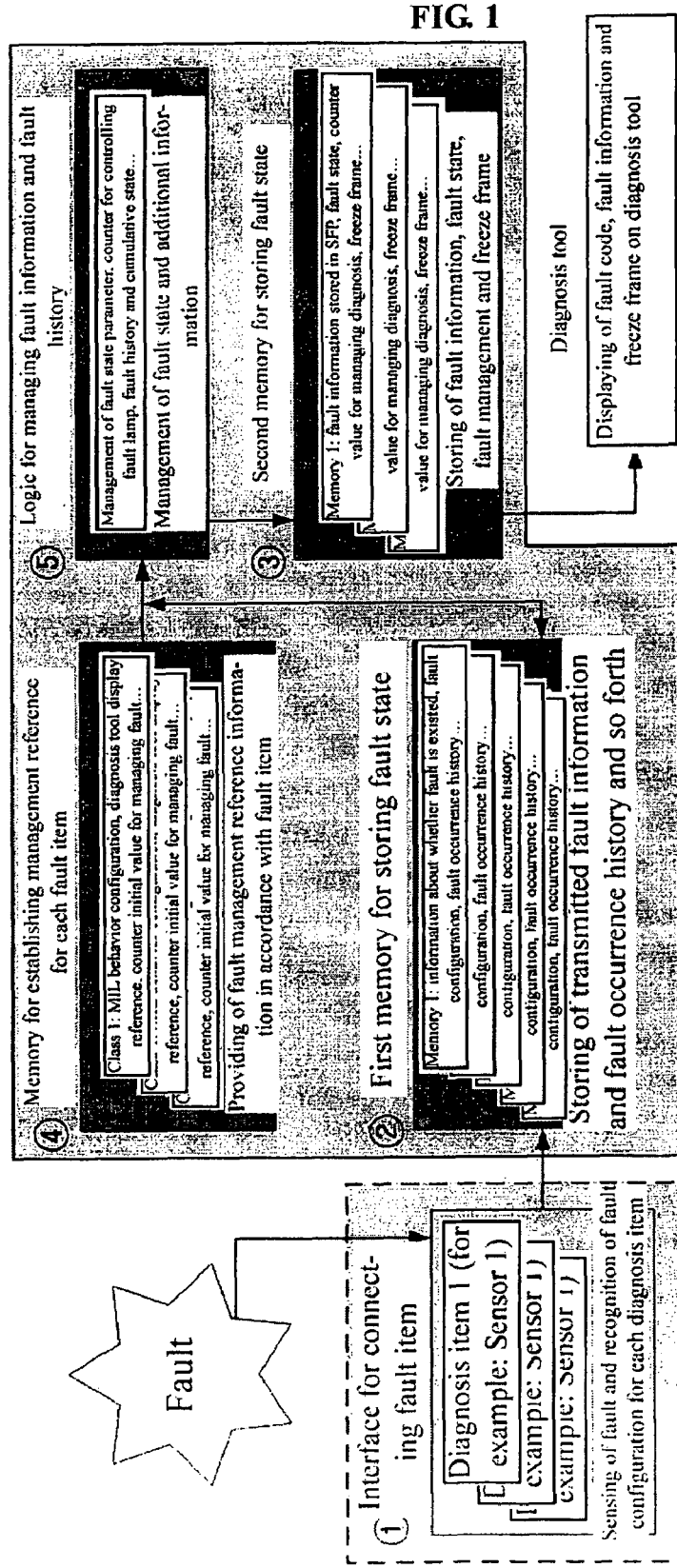
FIG. 1 is a block diagram showing a fault information management system for a vehicle according to the present invention.
Figure 2:
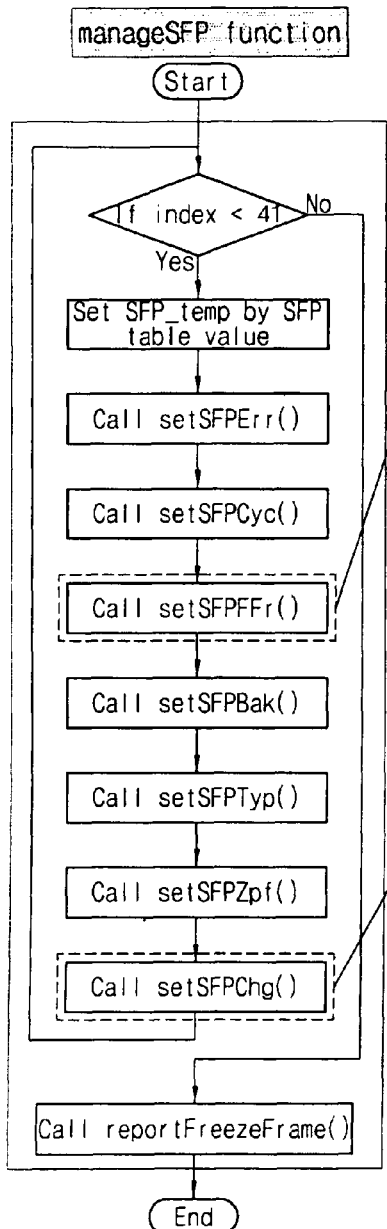
FIG. 2 is a flow chart showing a management logic of a first memory in a fault information management method for a vehicle according to the present invention.
Figure 2:
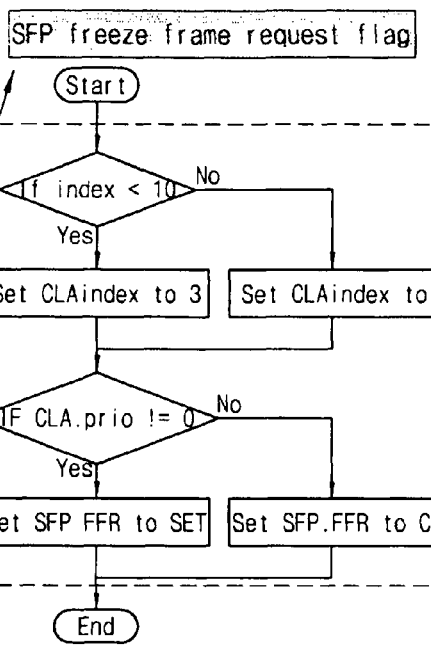
Figure 2:
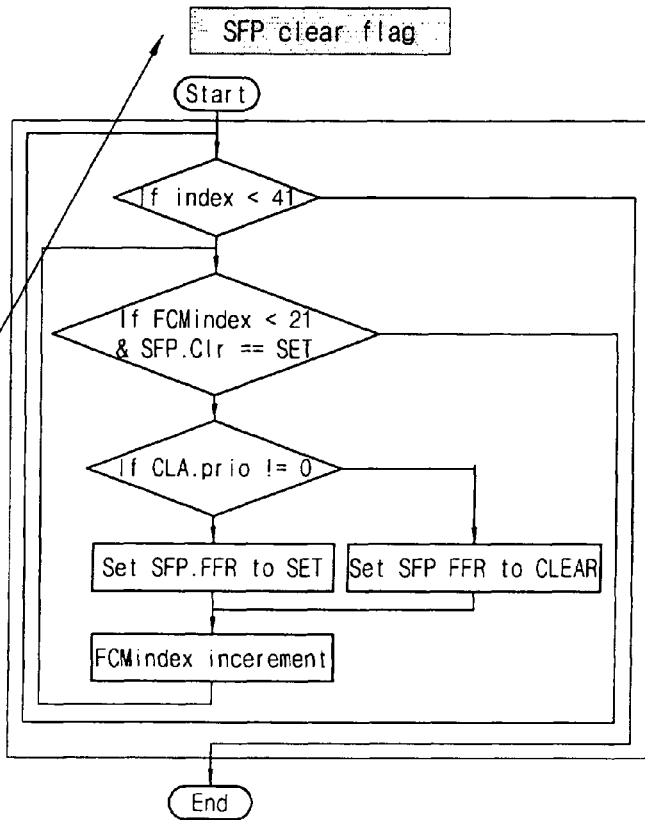
Figure 3:
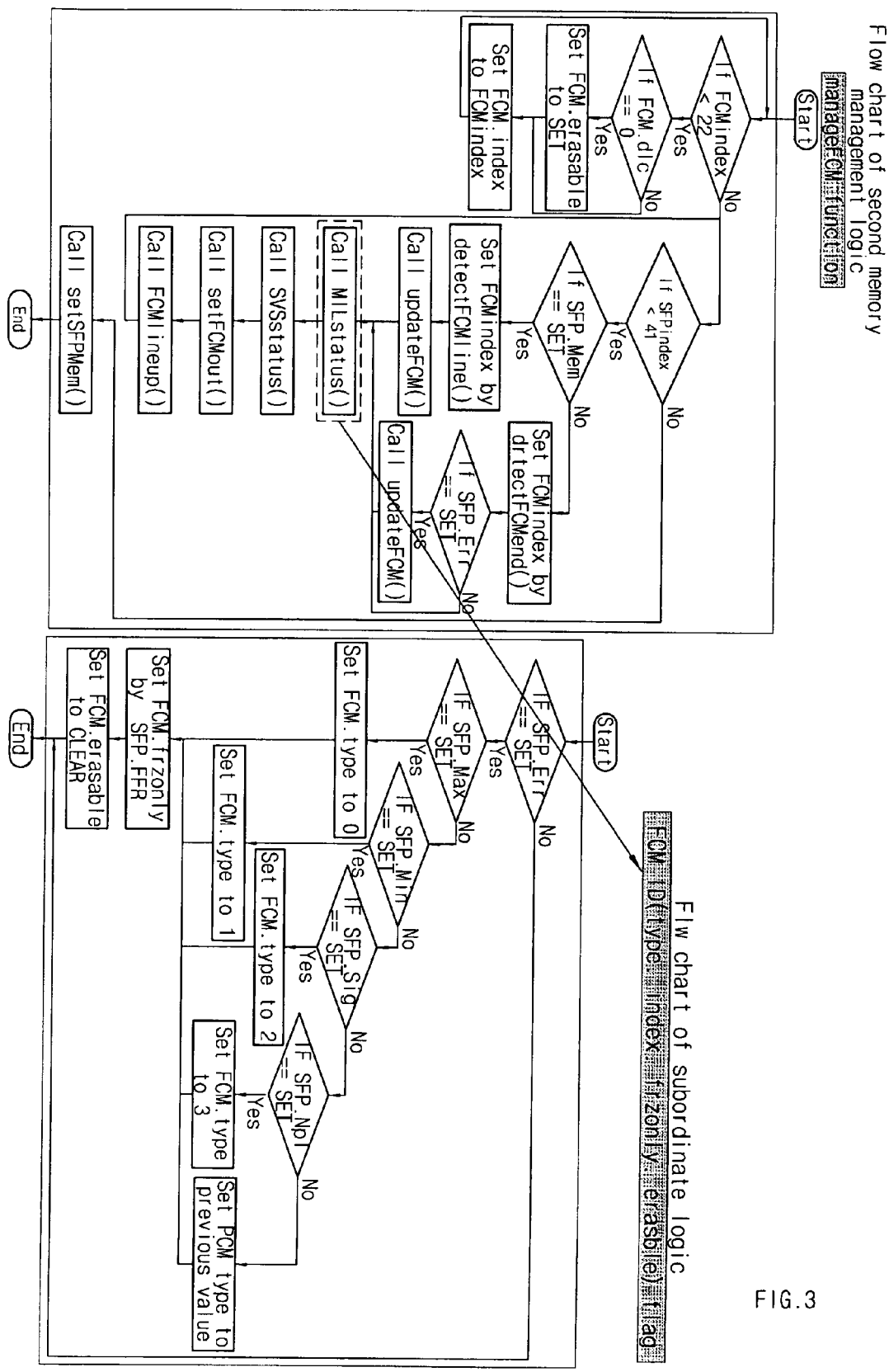
FIG. 3 is a flow chart showing a management logic of a second memory in a fault information management method for a vehicle according to the present invention.

Furthermore, a management logic of the first memory for storing the fault state, as shown in the flow chart of FIG. 2. The management logic is a function that receives information about whether a fault has occurred and information about fault configuration from the first memory for storing the fault state and converts to a fault state parameter preset in the first memory. The management logic is included in a basic program for a controller system and is performed at a predetermined time when operating a main program.

The memory for establishing the management reference for each fault item establishes the management reference for each fault item and transmits it to the logic. When the management reference for each fault item is established by a controller developer, the memory stores the established management reference in the logic which manages the fault to reflect thereto. As the management reference is stored in the memory, an initial value of a counter for determining a fault, a fault lamp operating mode, a critical value for displaying a fault are stored.

Figure 4:
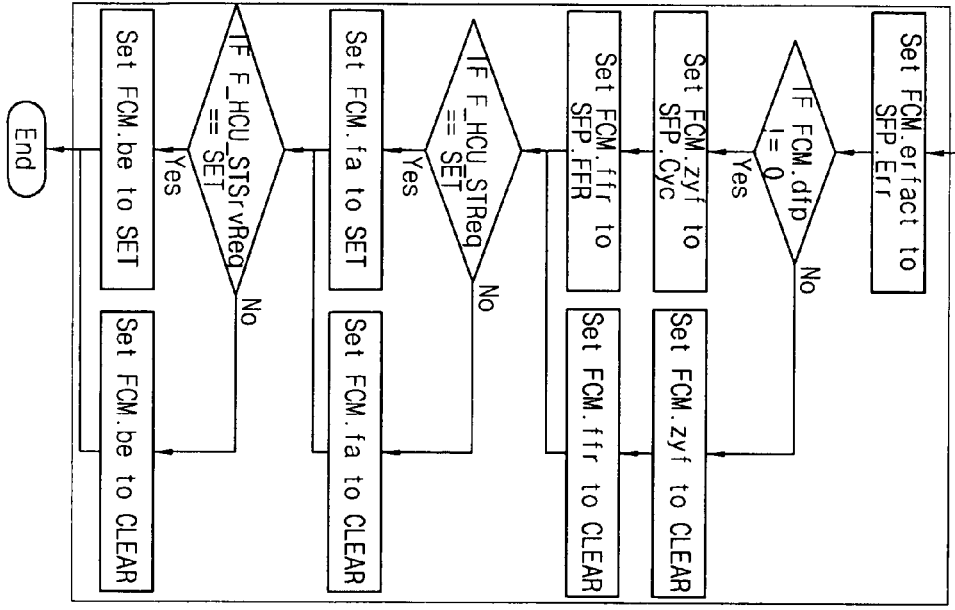
FIG. 4 is a flow chart showing a management logic of a logic which manages fault information and fault history in a fault information management method for a vehicle according to the present invention.
Figure 4:
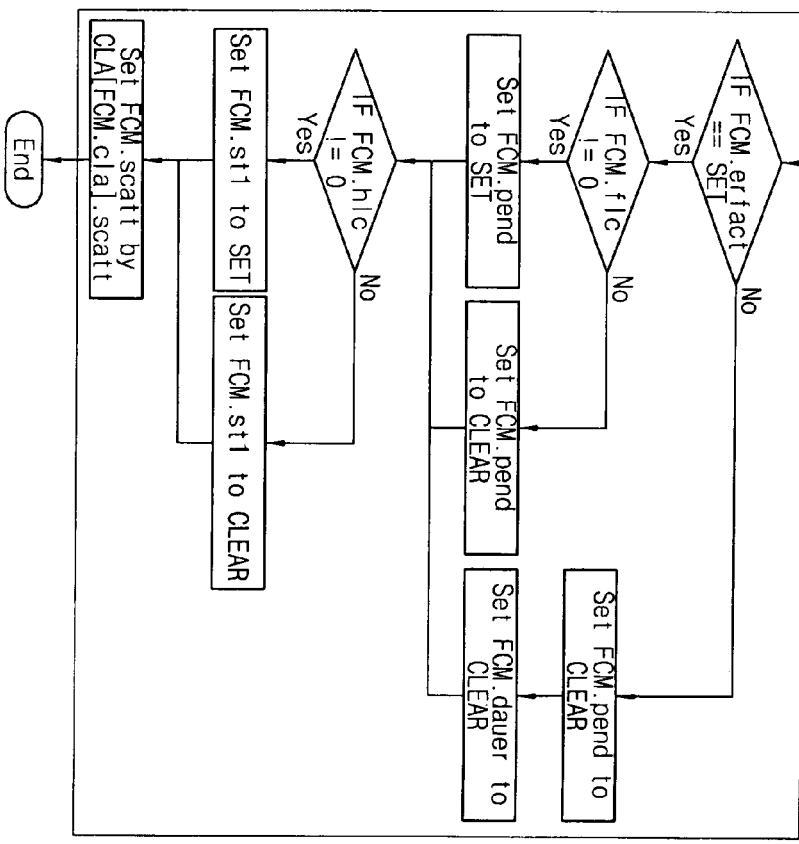

The logic manages the fault information and fault history. As shown in FIG. 4, a logic for managing the fault history is a logic for comparing fault information for the past fault history with the present state and managing them. The logic transmits the comparison result to the second memory for storing the fault state. The logic is included in the basic program for the controller system and is performed at a predetermined time when operating the main program.

Furthermore, the logic manages a transition of a fault state using fault information stored after managing the fault history. The logic is a function for transmitting the management result to the second memory. The logic is included in the basic program for the controller system and is performed at a predetermined time when operating the main program.

The second memory for storing the fault state serves for storing the fault information managed by the logic. The second memory stores the information transmitted from the logic so that fault basic information, a fault state, a counter for determining a fault and controller configuration information are stored depending on the fault occurrence order. The second memory then transmits the stored information to an external diagnosis tool so as to be displayed thereon.

Herein, a management logic of the second memory for storing the fault state is a function that receives fault basic information and information about fault configuration for storing the fault state from the first memory and converts that to a fault state parameter and an additional information preset in the second memory. The management logic is included in the basic program for the controller system and is performed at a predetermined time when operating the main program.

Although preferred embodiments of the present invention have been described for illustrative purposes, those skilled in the art will appreciate that various modifications and changes thereof are possible without departing from the scope and spirit of the present invention, and all modifications and changes are intended to be included within the description of the claims.

What is claimed is:

1. A fault information management system for a vehicle comprising:

an interface, for connecting a fault item, and which connects to each controller of a vehicle;

a first memory for storing a fault state, and which stores fault information occurring in the present time for each fault item;

a memory for establishing a management reference for each fault item, and transmits the reference to a logic;

a logic which manages fault information and fault history according to the management reference for each fault item; and a second memory which stores the fault information managed by the logic for managing the fault information, fault history together and priority order of the fault information.

2. The system of claim 1, further comprising an external diagnosis tool that displays the information stored in the second memory for storing the fault state.

3. A method for implementing a fault information management for a vehicle comprising the steps of:

detecting a fault for each fault item and recognizing a fault configuration in an interface;

storing fault information occurring in the present time for each fault item in a first memory;

establishing a management reference for each fault item;

transmitting the management reference to a logic which manages a fault in a memory for establishing the management reference for each fault item;

managing a fault state and further information according to the management reference for each fault item depending on the information provided from the first memory for storing the fault state and the memory for establishing the management reference for each fault item in the logic by managing fault information and fault history; and storing the fault information managed by the logic which manages the fault information and fault history together with priority order information of the fault information in a second memory for storing a fault state.

4. The method of claim 3, wherein the interface for connecting the fault item allows a preset fault-information-related parameter to be placed in a diagnosis function of a specific controller in order to minimize the setting of the fault-information-related parameter.

5. The method of claim 3, wherein information about whether there is a fault in the present time, information about whether there was a fault in the past time, and a fault configuration are stored in real time in the first memory.

6. The method of claim 3, wherein the second memory for storing the fault state stores information transmitted from the logic wherein basic fault information, a fault state, a counter for determining a fault and controller configuration information are stored in the second memory depending on the fault occurrence order, and transmits the stored information to an external diagnosis tool so as to be displayed thereon.

7. The method of claim 3, wherein when the management reference for each fault item is to be established by a controller developer, the memory for establishing the management reference for each fault item stores the established management reference in the logic, and an initial value of a counter for determining a fault, a fault lamp operating mode and a critical value for displaying a fault are stored as the management reference.

8. The method of claim 3, wherein the logic compares fault information for the past fault history with the present state, manages them, and transmits the comparison result to the second memory for storing the fault state.

* * * * *